United States Patent
Ashiya et al.

(10) Patent No.: US 10,084,786 B2
(45) Date of Patent: Sep. 25, 2018

(54) IDENTIFYING USER EQUIPMENT USING TUPLE OF BROWSER TYPE AND ELAPSED HASH TIME FOR CHALLENGE DATA SET

(71) Applicant: CA, INC., New York, NY (US)

(72) Inventors: Himanshu Ashiya, Bangalore (IN); Atmaram Shetye, Mapusa (IN)

(73) Assignee: CA, INC., New York, NY (US)

( * ) Notice: Subject to any disclaimer, the term of this patent is extended or adjusted under 35 U.S.C. 154(b) by 253 days.

(21) Appl. No.: 15/253,102

(22) Filed: Aug. 31, 2016

(65) Prior Publication Data
US 2018/0063142 A1    Mar. 1, 2018

(51) Int. Cl.
    *G06F 21/44*    (2013.01)
    *H04L 29/06*    (2006.01)
    *G06F 21/54*    (2013.01)

(52) U.S. Cl.
    CPC .............. *H04L 63/10* (2013.01); *H04L 63/08* (2013.01)

(58) Field of Classification Search
    None
    See application file for complete search history.

(56) References Cited

U.S. PATENT DOCUMENTS

| | | | | |
|---|---|---|---|---|
| 6,615,353 | B1* | 9/2003 | Hashiguchi | G06F 21/34 380/262 |
| 9,386,037 | B1* | 7/2016 | Hunt | H04L 63/1483 |

* cited by examiner

*Primary Examiner* — Venkat Perungavoor
(74) *Attorney, Agent, or Firm* — Sage Patent Group

(57) ABSTRACT

A historical repository of UE identifiers associated with sets of prior mean values and prior standard deviation values, is maintained. A browser request message is received from a web browser on a suspect UE and requests access to an electronic resource. An identification challenge message is sent toward the web browser and contains a hash script configured to be processed by the web browser to hash a challenge data set and to report a measurement of elapsed hashing time. A device identification report is received from the web browser and contains a terminal signature tuple of a reported UE identifier and the elapsed hashing time. A posterior probability value indicating a likelihood that the suspect UE corresponds to a genuine UE identified by the reported UE identifier, is generated. Whether the suspect UE is permitted to access the electronic resource is controlled based on the posterior probability value.

19 Claims, 11 Drawing Sheets

Process a combination of the mean value μ and the standard deviation value σ to generate a conditional likelihood probability (likelihood) value based on $$Likelihood = e^{-((X-\mu)^2/2\sigma^2)}/\sigma\sqrt{(2\pi)}$$

Send a browser request message by a web browser processed by the UE, and which requests access to an electronic resource controlled by a device identification computer — 1600

Receive an identification challenge message from the device identification computer, which contains a challenge data set and a hash script — 1602

Perform the hash script through the web browser to hash the challenge data set — 1604

Measure an elapsed hashing time for the hashing to be performed on the challenge data set — 1606

Send a device identification report by the web browser toward the device identification computer, the report containing a terminal signature tuple of a reported UE identifier and the elapsed hashing time — 1608

Control whether the web browser is permitted to access the electronic resource based on a response from the device identification computer — 1610

FIGURE 16

IDENTIFYING USER EQUIPMENT USING TUPLE OF BROWSER TYPE AND ELAPSED HASH TIME FOR CHALLENGE DATA SET

BACKGROUND

The present disclosure relates to identifying user equipments (UEs), and more particularly to controlling access attempts by multiple UEs to protected content.

Users can desire to access network accessible content from many different UEs, such as desktop computers, laptop computers, tablet computers, mobile phones, game consoles, media players, etc. At times, a user may attempt over time to access content from more than one UE. Typically, the user is permitted by a network accessible content server to have unrestricted access to the content from any UE after successfully completing authentication of user supplied credentials and determining that the user has authorized access.

Some computer systems attempt to restrict access, such as to documents containing confidential information or copyrighted works, to only authorized users who are operating authorized UEs. The authorized UEs may be allowed access because they are determined to be more secure by design and/or trusted because of a known relationship to the authorized users. Such computer systems need a way to restrict access to content by UEs and users having a unique identities. However, fraudsters have developed sophisticated techniques to obtain credentials of users who are authorized to access content. Some of these fraudsters have moreover developed sophisticated techniques to enable non-authorized UEs to impersonate authorized UEs.

Using third party cookies as a way to identify UEs is being phased out due to privacy concerns and the ability of users to prevent or interfere with their use. Cookieless device identification has therefore become an important goal of operation for some computer systems. Not being able to reliably identify a UE can create a potential system entry point for users with unauthorized or malicious intent to access or modify services. Techniques for authenticating users using, e.g., one time passwords (OTPs) can be viewed as unacceptably inconvenient by the users. Developing a list of blacklisted devices by one computer system may not be useful to other computer systems, particularly when operated in different system domains, e.g., under ownership of different entities. If computer systems could rely on trusted universal identification for UEs, at least some of these challenges could be reduced or overcome.

SUMMARY

Some embodiments disclosed herein are directed to a method of performing operations on a processor of a device identification computer. The method includes maintaining in a memory device a historical repository of user equipment (UE) identifiers associated with sets of prior mean values and prior standard deviation values. A browser request message is received via a network interface from a web browser being processed by a suspect UE, the browser request message requesting access to an electronic resource controlled by the device identification computer. An identification challenge message is sent via the network interface toward the web browser being processed by the suspect UE, the identification challenge message containing a challenge data set and a hash script, the hash script configured to be processed by the web browser to hash the challenge data set and to report a measurement of elapsed hashing time for the hashing to be performed on the challenge data set. A device identification report is received from the web browser via the network interface, the device identification report containing a terminal signature tuple of a reported UE identifier and the elapsed hashing time. A posterior probability value indicating a likelihood that the suspect UE corresponds to a genuine UE identified by the reported UE identifier, is generated based on processing a combination of the terminal signature tuple and one of the sets of the prior mean values and the prior standard deviation values in the historical repository that is associated with the reported UE identifier. The method controls whether the suspect UE is permitted to access the electronic resource based on the posterior probability value.

Some other related embodiments disclosed herein are directed to a device identification computer that includes a network interface circuit, a processor circuit coupled to the network interface, and a memory circuit. The network interface circuit is configured to communicate with UEs. The memory circuit is coupled to the processor circuit and stores program code which when executed by the processor causes the processor to perform operations. The operations include in a memory device a historical repository of UE identifiers associated with sets of prior mean values and prior standard deviation values. A browser request message is received from a web browser being processed by a suspect UE, where the browser request message requests access to an electronic resource controlled by the device identification computer. An identification challenge message is sent via the network interface toward the web browser being processed by the suspect UE, the identification challenge message containing a challenge data set and a hash script, the hash script configured to be processed by the web browser to hash the challenge data set and to report a measurement of elapsed hashing time for the hashing to be performed on the challenge data set. A device identification report is received from the web browser via the network interface, the device identification report containing a terminal signature tuple of a reported UE identifier and the elapsed hashing time. A posterior probability value indicating a likelihood that the suspect UE corresponds to a genuine UE identified by the reported UE identifier, is generated based on processing a combination of the terminal signature tuple and one of the sets of the prior mean values and the prior standard deviation values in the historical repository that is associated with the reported UE identifier. The operations control whether the suspect UE is permitted to access the electronic resource based on the posterior probability value.

Some other embodiments disclosed herein are directed to a method of performing operations on a processor of a UE. A browser request message is sent by a web browser being processed by the UE. The browser request message requests access to an electronic resource controlled by a device identification computer. An identification challenge message is received via a network interface from the device identification computer. The identification challenge message contains a challenge data set and a hash script. The hash script is performed through the web browser to hash the challenge data set. An elapsed hashing time for the hashing to be performed on the challenge data set is measured. A device identification report is sent by the web browser via the network interface toward the device identification computer, where the device identification report contains a terminal signature tuple of a reported UE identifier and the elapsed hashing time. The operations control whether the web browser is permitted to access the electronic resource based on a response from the device identification computer.

Other methods, device identification computers, UEs, systems, and computer program products according to embodiments will be or become apparent to one with skill in the art upon review of the following drawings and detailed description. It is intended that all such additional methods, device identification computers, UEs, systems, and computer program products be included within this description and protected by the accompanying claims.

BRIEF DESCRIPTION OF THE DRAWINGS

Aspects of the present disclosure are illustrated by way of example and are not limited by the accompanying drawings. In the drawings:

FIGS. 9-15 are flowcharts of further operations by the device identification computer that restrict access to content available through a content server based on posterior probability values in accordance with some embodiments of the present disclosure FIG. 16 is a flowchart of operations by a UE to generate a device identification report responsive to an identification challenge from a device identification computer in accordance with some embodiments of the present disclosure;

DETAILED DESCRIPTION

Various embodiments will be described more fully hereinafter with reference to the accompanying drawings. Other embodiments may take many different forms and should not be construed as limited to the embodiments set forth herein. Like numbers refer to like elements throughout.

Various embodiments of the present disclosure arise from the present realization that JavaScript processing engines are configured differently and have different processing optimization when used with different types of web browsers. This realization combined with differences with the underlying operating system and hardware processing architecture of the host UE results in a different operational benchmark for a JavaScript on a first UE, which has a first combination of web browser type and underlying operating system and hardware processing architecture, compared to operation of the JavaScript on a second UE which has a different second combination of web browser type and underlying operating system and hardware processing architecture. Thus, benchmarking operation of the JavaScript on a UE can provide a device fingerprint that can be used consistently to distinguish the first UE or other similarly configured UEs having the first combination from the second UE or other similarly configured UEs having second combination.

These and other embodiments are explained in the non-limiting context of FIGS. 1-18.

Figure 1:
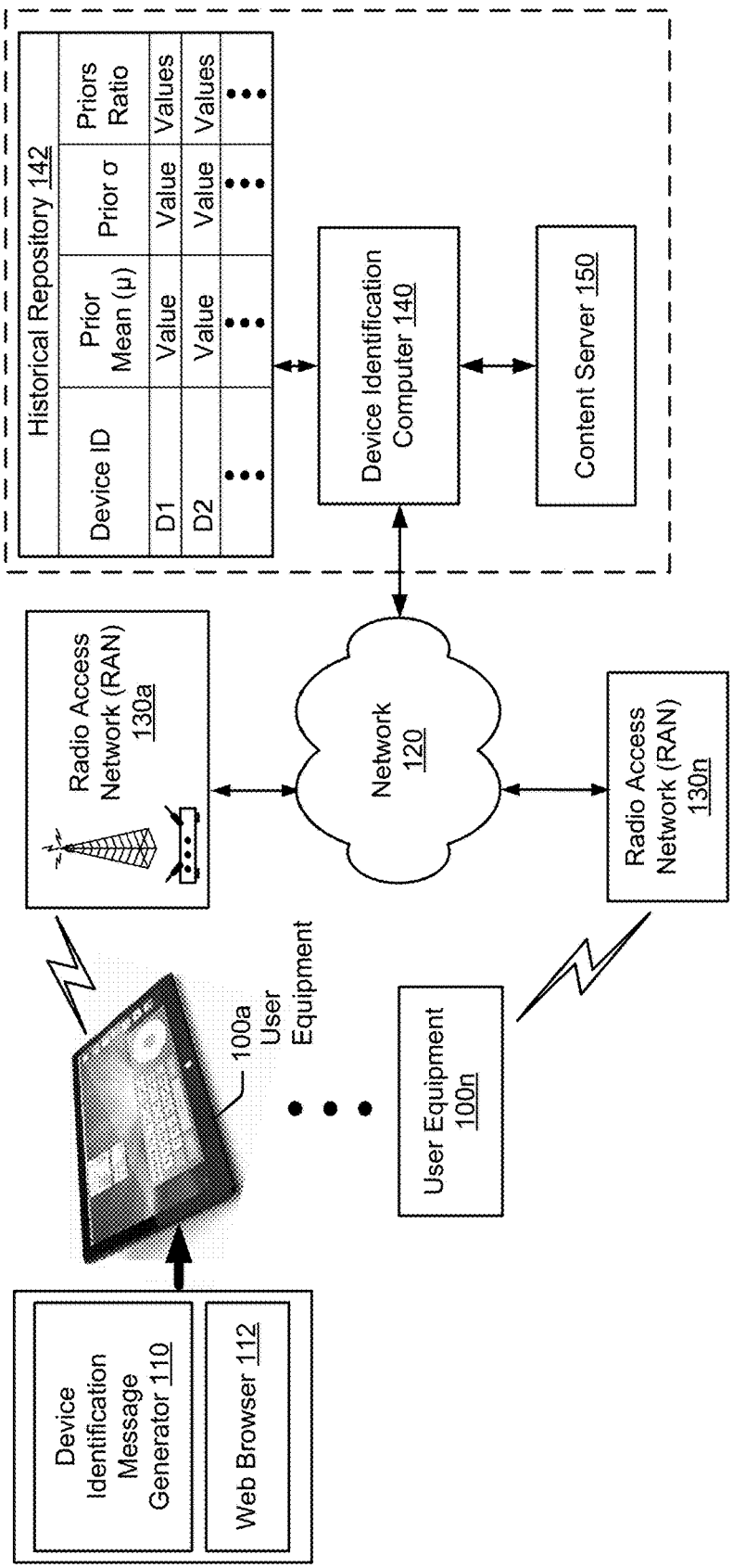
FIG. 1 is a block diagram of a device identification computer operating in an example system to restrict access to content available through a content server based on posterior probability values indicating whether a suspect UE corresponds to a genuine UE associated with a UE identifier, in accordance with some embodiments of the present disclosure.

FIG. 1 is a block diagram of a device identification computer operating in an example system to restrict access to content available through a content server based on posterior probability values indicating whether a suspect UE corresponds to a genuine UE associated with a UE identifier, in accordance with some embodiments of the present disclosure.

Referring to FIG. 1, a user may be able to operate each of the UEs 100a-100n (individually referred to as UE 100) to attempt to access content through the content server 150 via one or more radio access networks 130a-130n and a data network 120. At times, the user may operate one or more of the UEs 100a-100n simultaneously or sequentially to attempt to access the content. The UE 100 may be any electronic computing device that can communicate through one or more communication networks with the content server 150, including, but not limited to, a desktop computer, a laptop computer, a tablet computer, a mobile phone, a game console, a media player, etc.

In accordance with various embodiments disclosed herein, the content server 150 restricts access by UEs to electronic content based on the device identification computer 140 determining that UE requesting access is genuinely associated with a UE identifier that has been granted access to that electronic content. Whether a UE is determined to be genuine depends on an elapsed hashing time needed for the UE's web browser to process a hash script (e.g., JavaScript) in order to hash a challenge data set which was earlier provided by the device identification computer 140.

In the example of FIG. 1, the UE 100 includes a device identification message generator 110 and a web browser 112. The web browser 112 may correspond to, without limitation, Firefox, Internet Explorer, or Chrome brands of web browsers. The generator 110 may be performed by lightweight code provided by the device identification computer 140, the content server 150, and/or another provider interface for execution by the UE 100 during a web browsing session to receive an identification challenge message containing the hash script and challenge data set from the device identification computer 140, and to send a device identification report containing an elapsed hashing time for the hashing to be performed by the web browser 112 performing the JavaScript on the challenge data set.

A user can supply a user identifier and password through the web browser 112 to login to a website hosted by the content server 150, and to generate a browser request message requesting access to an electronic resource on the content server 150. The UE 100 may otherwise generate the user identifier using user fingerprint authentication or other user biometric authentication operations.

The device identification computer 140 controls access to electronic resources on the content server 150, and may intercept browser request messages being communicated from the web browser 112 toward the content server 150 and selectively forward a browser request message based on a result of analyzing content of the device identification report from a web browser 112. The content may reside within the content server 150 and/or may be available through the content server 150 from a content provider (e.g., a streaming video subscription operator) and/or may be reside on the UE 100 in a locked format which is unlocked using a key or other authorization code obtainable from the content server 150 under control of the device identification computer 140.

Figure 2:
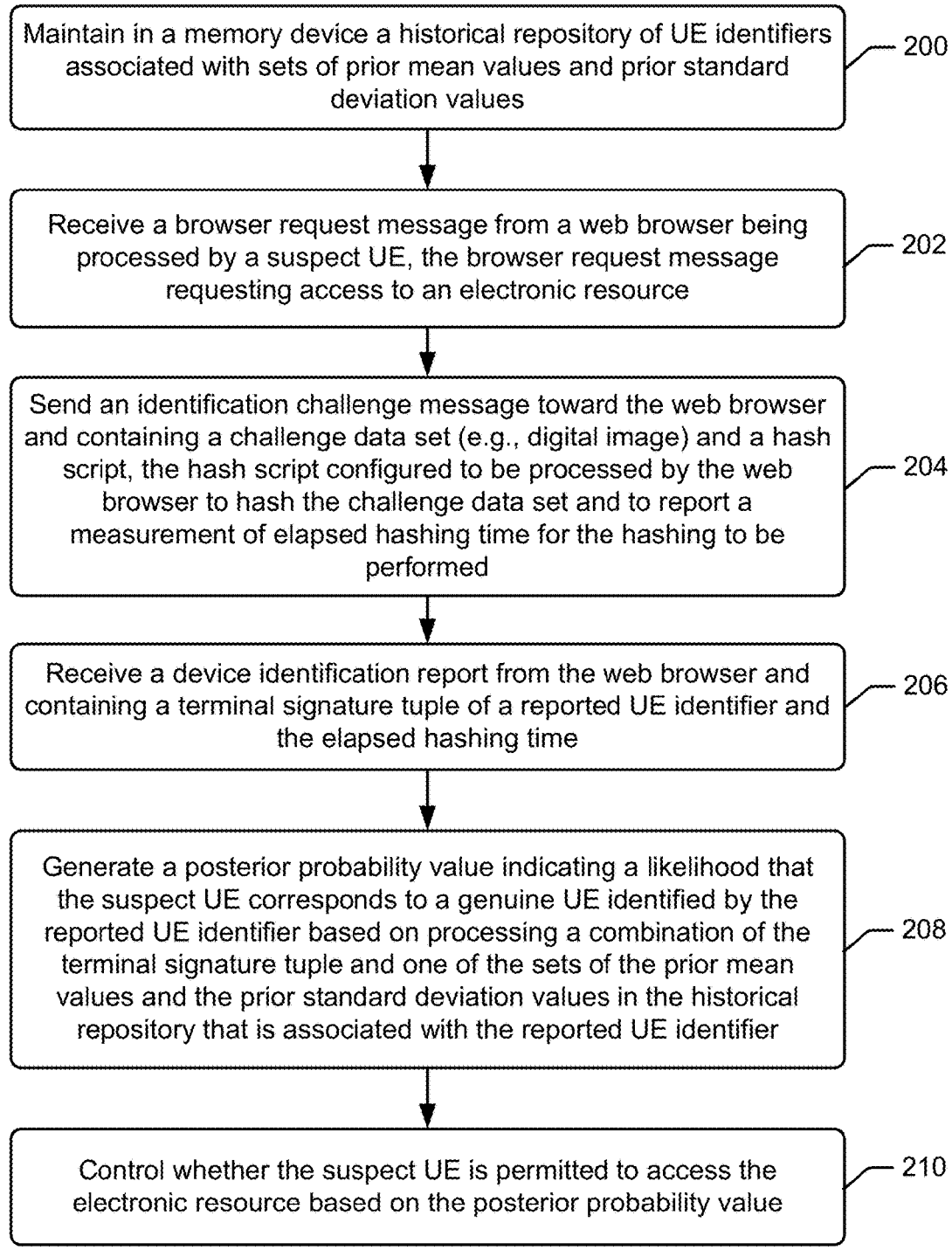
FIG. 2 is a flowchart of operations by the device identification computer that restrict access to content available through a content server based on posterior probability values indicating whether a suspect UE corresponds to a genuine UE associated with a UE identifier, in accordance with some embodiments of the present disclosure.

FIG. 2 is a flowchart of operations by the device identification computer 140 that restrict access to content available through the content server 150 based on posterior probability values indicating whether a suspect UE 100a corresponds to a genuine UE associated with a UE identifier, e.g., a media access control (MAC) address, in accordance with some embodiments of the present disclosure. FIG. 16 is a flowchart of corresponding operations by a suspect UE 100a to generate a device identification report responsive to an identification challenge from the device identification computer 140 in accordance with some embodiments of the present disclosure.

Referring to FIGS. 1, 2, and 16, the device identification computer 140 maintains (Block 200) in a memory device a historical repository 142 of UE identifiers, e.g., media access control (MAC) addresses, associated with sets of prior mean values and prior standard deviation values. The suspect UE 100a operates a web browser 112 to send (block 1600) a browser request message, which may be addressed to the device identification computer 140 or to the content server 150. The browser request message requests access to an electronic resource controlled by the device identification computer 140, and which may be stored on the content server 150 and/or which may be accessible through the content server 150. The browser request message may be sent (block 1600) as part of a login process or following a login process during which user credentials (e.g., account identifier and password, biometric fingerprint data, etc.) are provided through the web browser 112 for authentication by the content server 150. Although the device identification computer 140 and the content server 150 are separately illustrated for ease of explanation, is to be understood that their functionality may be combined into one physical hardware resource, such as a network web server device.

The device identification computer 140 receives (block 202) the browser request message via a network interface from the web browser 112. The device identification computer 140 sends (block 204) an identification challenge message via the network interface toward the web browser 112 being processed by the suspect UE 100a. The identification challenge message contains a challenge data set and a hash script, where the hash script is configured to be processed by the web browser 112 to hash the challenge data set and to report a measurement of elapsed hashing time for the hashing to be performed on the challenge data set. As explained in further detail below, the challenge data set may correspond to a digital image, which may be selected from among a set of digital images based on the earlier provided user credentials, a reported UE identifier, and/or other information. The digital image can be retrieved from a local memory of the device identification computer 140 and embedded within the identification challenge message that is generated and sent to the UE.

The suspect UE 100a receives (block 1602) the identification challenge message via a network interface from the device identification computer 140, and performs (block 1604) the hash script through processing of the web browser 112 to hash the challenge data set. The suspect UE 100a measures (block 1606) an elapsed hashing time for the hashing to be performed on the challenge data set. Suspect UE 100a then generates and sends (block 1608) a device identification report by the web browser 112 via the network interface toward the device identification computer 140. The device identification report contains a terminal signature tuple of a reported UE identifier and the elapsed hashing time.

The device identification computer 140 receives (block 206) the device identification report from the web browser via the network interface, and generates (Block 208) a posterior probability value indicating a likelihood that the suspect UE 100a corresponds to a genuine UE identified by the reported UE identifier based on processing a combination of the terminal signature tuple and one of the sets of the prior mean values and the prior standard deviation values in the historical repository 142 that is associated with the reported UE identifier. A device identification computer 140 responsively controls (block 210) whether the suspect UE is permitted to access the electronic resource based on the posterior probability value. The computer 140 may transmit a response to the suspect UE 100a that controls (block 1610) whether the web browser 112 is permitted to access the electronic resource.

FIGS. 3-8 illustrate graphs of experimental results of operations that were performed to validate the feasibility of generating a device fingerprint based on benchmarking the elapsed hashing time by a suspect UE based on its combination of web browser type and underlying operating system and hardware processing architecture. In FIGS. 3-8 the horizontal axis represents the elapsed hashing times measured for a particular UE to repetitive perform a hash script on a digital image, and the vertical axis represents the number of occurrence of the respective elapsed hashing times.

Figure 3:
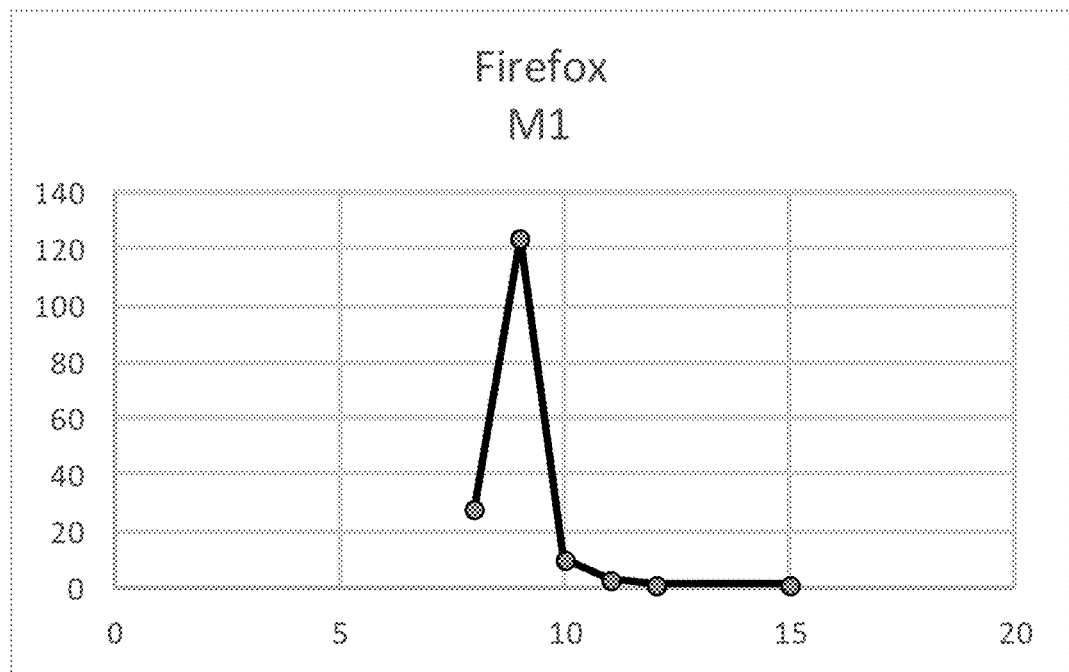
FIGS. 3 and 4 are graphs illustrating results of benchmarking the number of occurrences of elapsed hashing times resulting from repetitive performances, by a Firefox web browser on two difference UEs, of a hash script on a digital image in accordance with some embodiments of the present disclosure.
Figure 4:
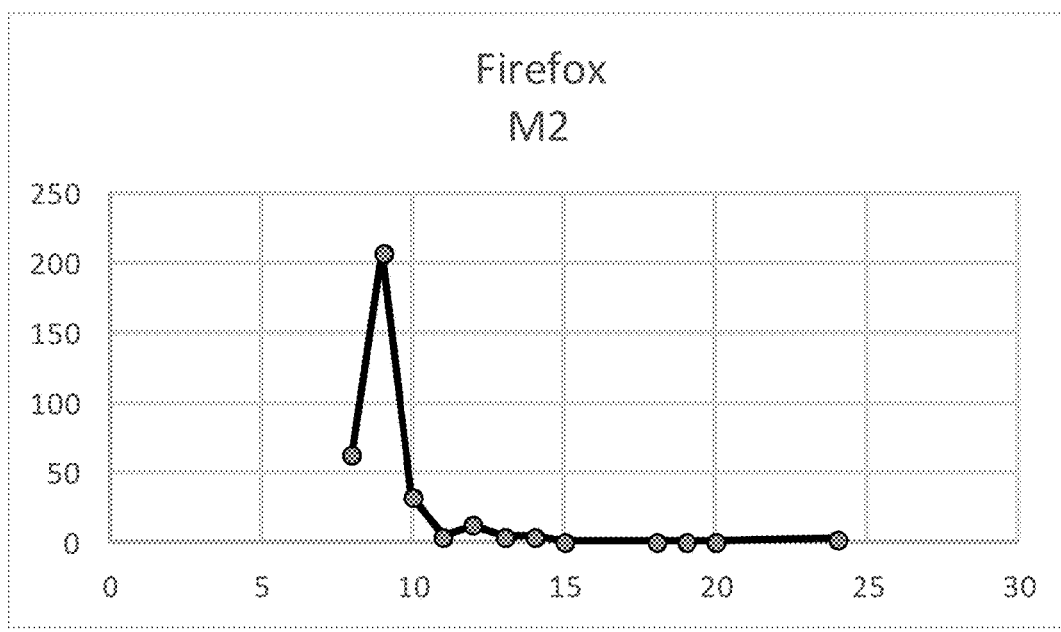

FIGS. 3 and 4 are graphs illustrating results of benchmarking the number of occurrences of elapsed hashing times resulting from repetitive performances, by a Firefox web browser on two difference UEs, of a hash script on a digital image in accordance with some embodiments of the present disclosure. In FIG. 3, repetitive benchmarking of a first UE (M1) provided a spike at a first elapsed hashing time (e.g., about 9 ms) in the number of respective occurrences of those elapsed hashing times (e.g., about 124 occurrences). In FIG. 4, repetitive benchmarking of a second UE (M2), which has a different hardware processing architecture than M1, provided a spike at a second elapsed hashing time (e.g., about 9 ms) at a higher number of respective occurrences of that elapsed hashing times (e.g., about 207 occurrences). The second UE (M2) therefore has a different most commonly occurring range of the elapsed hashing times than the second UE (M1). The graphs of FIGS. 3 and 4 therefore form unique signatures that can be used to distinguish between the first and second UEs.

Figure 5:
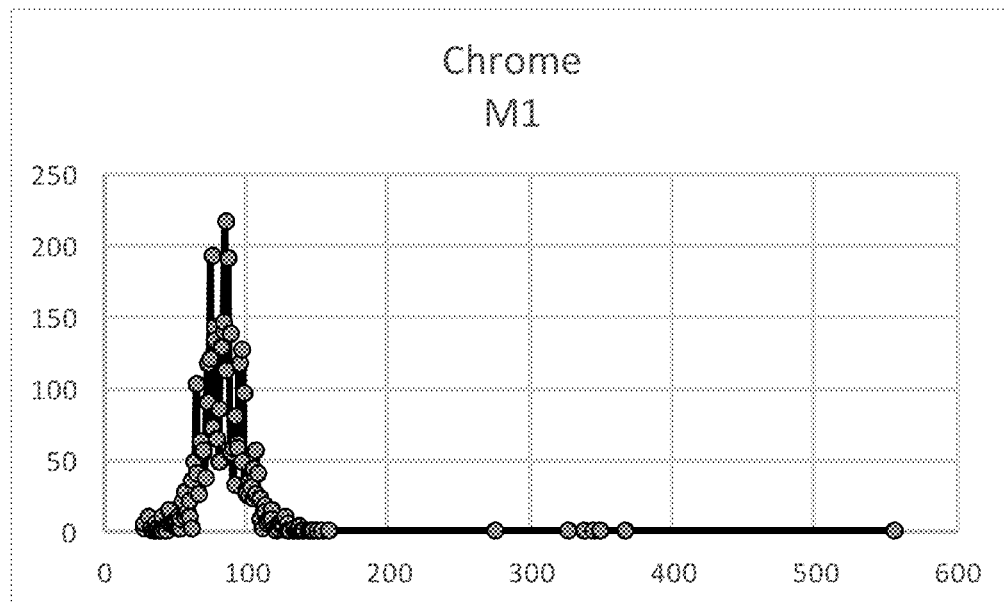
FIGS. 5 and 6 are graphs illustrating results of benchmarking the number of occurrences of elapsed hashing times from repetitive performances, by a Chrome web browser on two difference UEs, of a hash script on a digital image in accordance with some embodiments of the present disclosure.
Figure 6:
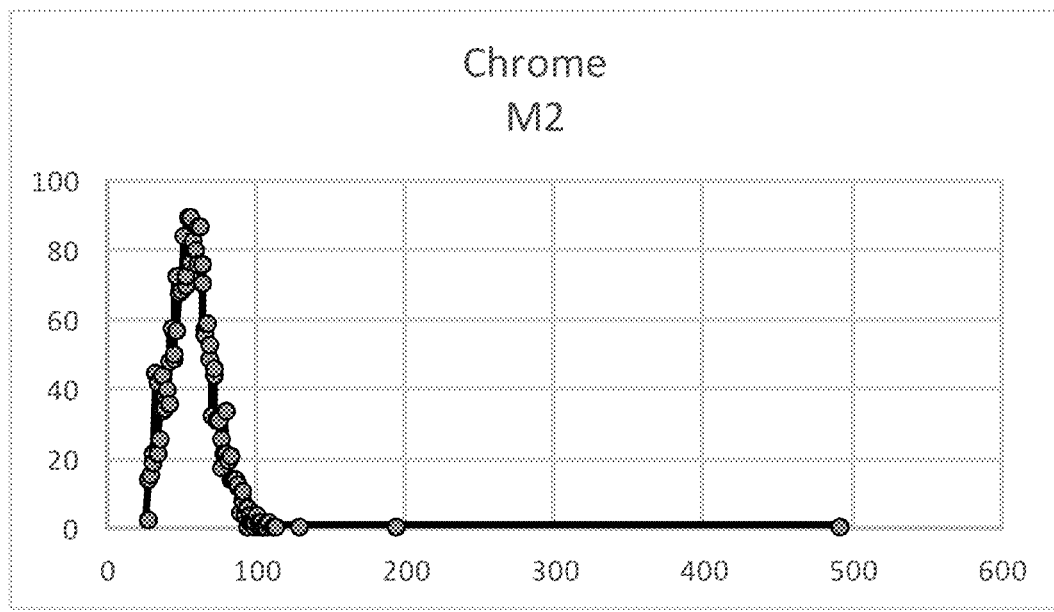

FIGS. 5 and 6 are graphs illustrating results of benchmarking the number of occurrences of elapsed hashing times from repetitive performances, by a Chrome web browser on two difference UEs, of a hash script on a digital image in accordance with some embodiments of the present disclosure. In FIG. 5, repetitive benchmarking of the first UE (M1) provided a spike at a first elapsed hashing time (e.g., about 85 ms) in the number of respective occurrences of those elapsed hashing times (e.g., about 218 occurrences). In FIG. 6, repetitive benchmarking of the second UE (M2) provided a spike at a second elapsed hashing time (e.g., about 56 ms) a number of respective occurrences of that elapsed hashing times (e.g., about 90 occurrences) that are different than for the first UE. The graphs of FIGS. 5 and 6 therefore again form unique signatures that can be used to distinguish between the first and second UEs.

Figure 7:
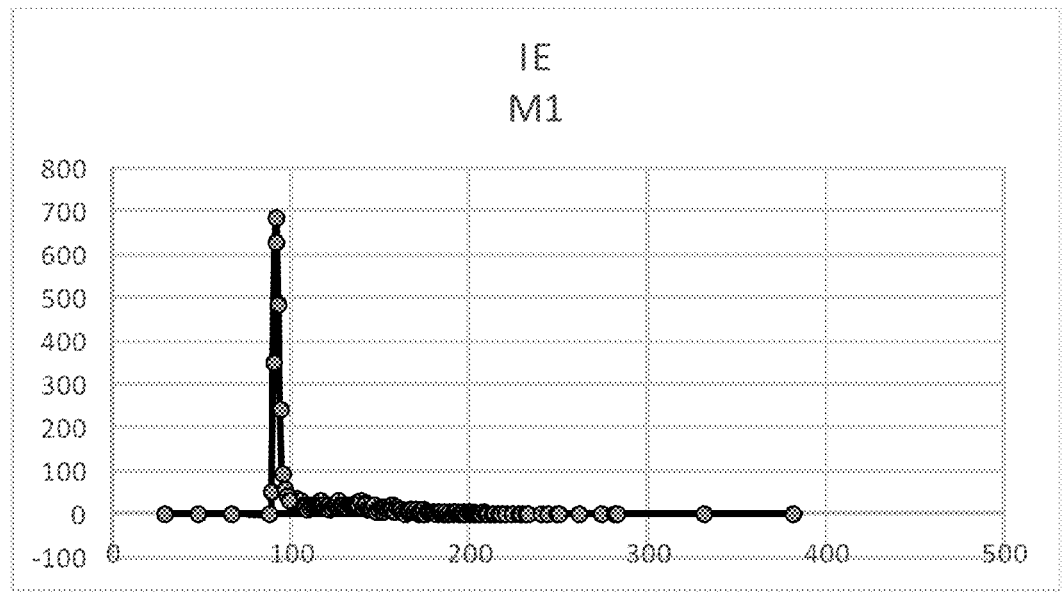
FIGS. 7 and 8 are graphs illustrating results of benchmarking the number of occurrences of elapsed hashing times from repetitive performances, by an Internet Explorer web browser on two difference UEs, of a hash script on a digital image in accordance with some embodiments of the present disclosure.
Figure 8:
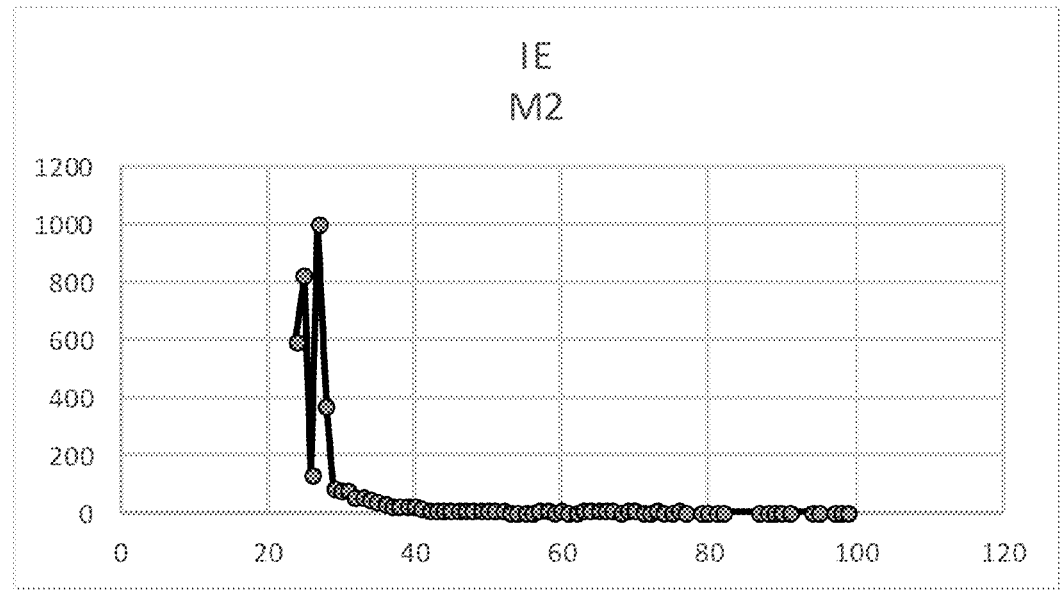

FIGS. 7 and 8 are graphs illustrating results of benchmarking the number of occurrences of elapsed hashing times from repetitive performances, by an Internet Explorer web browser on two difference UEs, of a hash script on a digital image in accordance with some embodiments of the present disclosure. In FIG. 7, repetitive benchmarking of the first UE (M1) provided a spike at a first elapsed hashing time (e.g., about 105 ms) in the number of respective occurrences of those elapsed hashing times (e.g., about 33 occurrences). In FIG. 8, repetitive benchmarking of the second UE (M2) provided a spike at a second elapsed hashing time (e.g., about 27 ms) at a higher number of respective occurrences of that elapsed hashing times (e.g., about 997 occurrences). The graphs of FIGS. 5 and 6 therefore again form unique signatures that can be used to distinguish between the first and second UEs.

Figure 9:
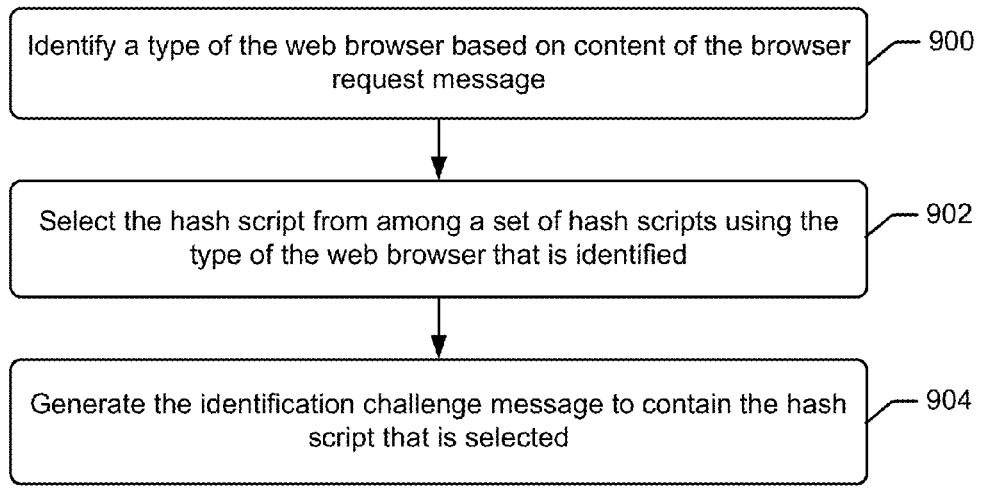

FIG. 9 illustrates operations and methods that may be performed by the device identification computer 140 to select the hash script that is to be sent (block 204, FIG. 2) to the suspect UE 100a. Referring to FIG. 9, responsive to receipt (block 202) of the browser request message, the computer 140 identifies (block 900) a type of the web browser (e.g., FireFox, Internet Explorer, Chrome, etc.) based on content of the browser request message, and selects (block 902) the hash script from among a set of hash scripts using the type of the web browser that is identified. The computer 140 then generates (block 904) the identification challenge message, which is to be sent, to contain the hash script that is selected. In this manner, the hash script that is sent to a particular web browser can be configured and optimized for processing by that web browser type, and different hash scripts can be selected for sending based on the identified type of web browser that is to receive that hash script. For example, the hash scripts may perform different hashing operations on all or a subset of the challenge data set, e.g., one hash script may hash the entire challenge data set in contrast to another hash script that hashes only a defined subset range of the challenge data set.

Figure 10:
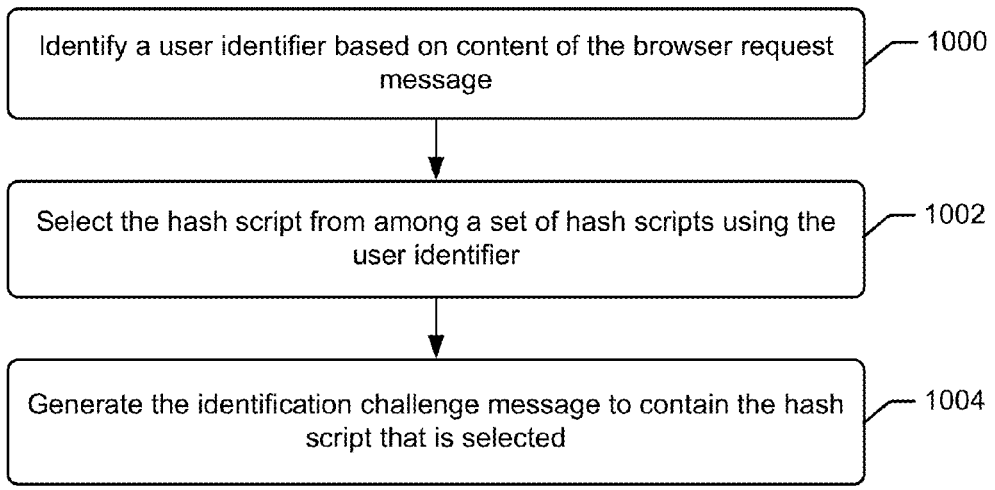

FIG. 10 illustrates alternative or additional operations and methods that may be performed by the device identification computer 140 to select the hash script that is to be sent (block 204, FIG. 2) to the suspect UE 100a. Referring to FIG. 10, the computer 140 identifies (block 1000) a user identifier, e.g., a user login identifier, based on content of the browser request message, and selects (block 1002) the hash script from among a set of hash scripts using the user identifier that is identified. The computer 140 then generates (block 1004) the identification challenge message, which is to be sent, to contain the hash script that is selected. In this manner, different hash scripts can be sent to web browsers depending upon the particular user identifier that is associated with a web browser session operating through the web browser, which further operates the selective granting of access to a resource by the computer 140 to be depended upon the user identifier.

Figure 11:
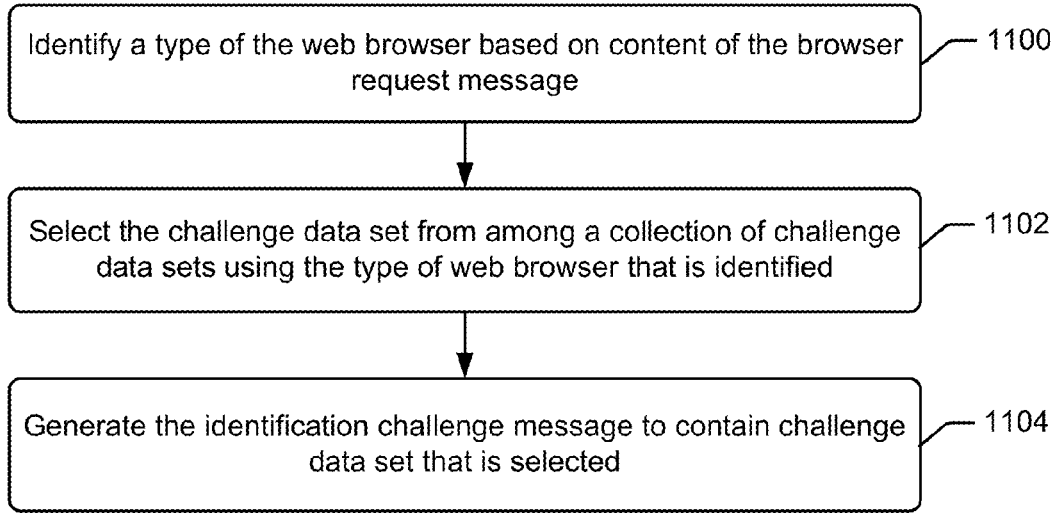

FIG. 11 illustrates further alternative or additional operations and methods that may be performed by the device identification computer 140 to select the challenge data set that is to be sent (block 204, FIG. 2) to the suspect UE 100a. Referring to FIG. 11, responsive to receipt (block 202) of the browser request message, the computer 140 identifies (block 1100) a type of the web browser based on content of the browser request message, and selects (block 1102) the challenge data set from among a collection of challenge data sets using the type of the web browser that is identified. The computer 140 then generates (block 1104) the identification challenge message, which is to be sent, to contain the challenge data set that is selected. In this manner, the challenge data set that is sent to a particular web browser can be configured and optimized for processing by that web browser type, and different challenge data sets can be selected for sending based on the identified type of web browser that is to receive that challenge data set. For example, the size of the challenge data set, the number of bits per value in the challenge data set, and/or other characteristics of the challenge data set may be configured to be different than another one of the challenge data sets in the collection.

Figure 12:
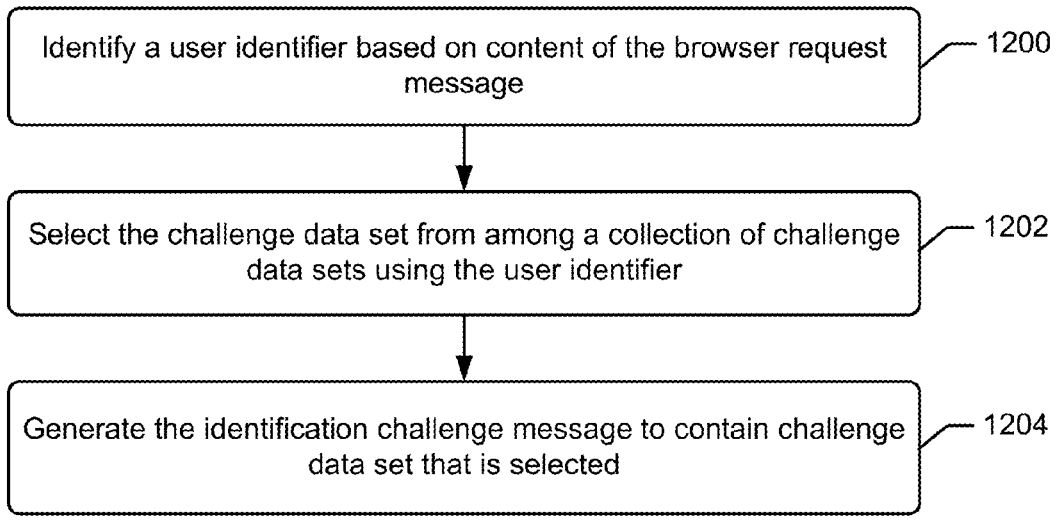

FIG. 12 illustrates further alternative or additional operations and methods that may be performed by the device identification computer 140 to select the challenge data set that is to be sent (block 204, FIG. 2) to the suspect UE 100a. Referring to FIG. 12, the computer 140 identifies (block 1200) a user identifier, e.g., a user login identifier, based on content of the browser request message, and selects (block 1202) the challenge data set from among a collection of challenge data sets using the user identifier that is identified. The computer 140 then generates (block 1204) the identification challenge message, which is to be sent, to contain the challenge data set that is selected. In this manner, different challenge data sets can be sent to web browsers depending upon the user that is associated with a web browser session operating through the web browser, which further operates the selective granting of access to a resource by the computer 140 to be depended upon the user identifier.

The operation for selecting (block 1202) the challenge data set from among a collection of challenge data sets using the user identifier that is identified, can include converting the user identifier into a set lookup address, and retrieving a digital image from the memory device using the set lookup pointer. In one embodiment, different user identifiers can be associate with different digital images which are sent to the UEs for display through their respective web browsers. The digital image may be provided to the user for the additional purpose of enabling the user to confirm that the digital image corresponds to what is expected to be received when logging into the user's account, and which may thereby serve to enable a user to verify that the UE 100 is communicating with an authorized content server 150 as opposed to another content server that is spoofing (e.g., fraudulently imitating) the identity of the authorized content server 150.

Figure 13:
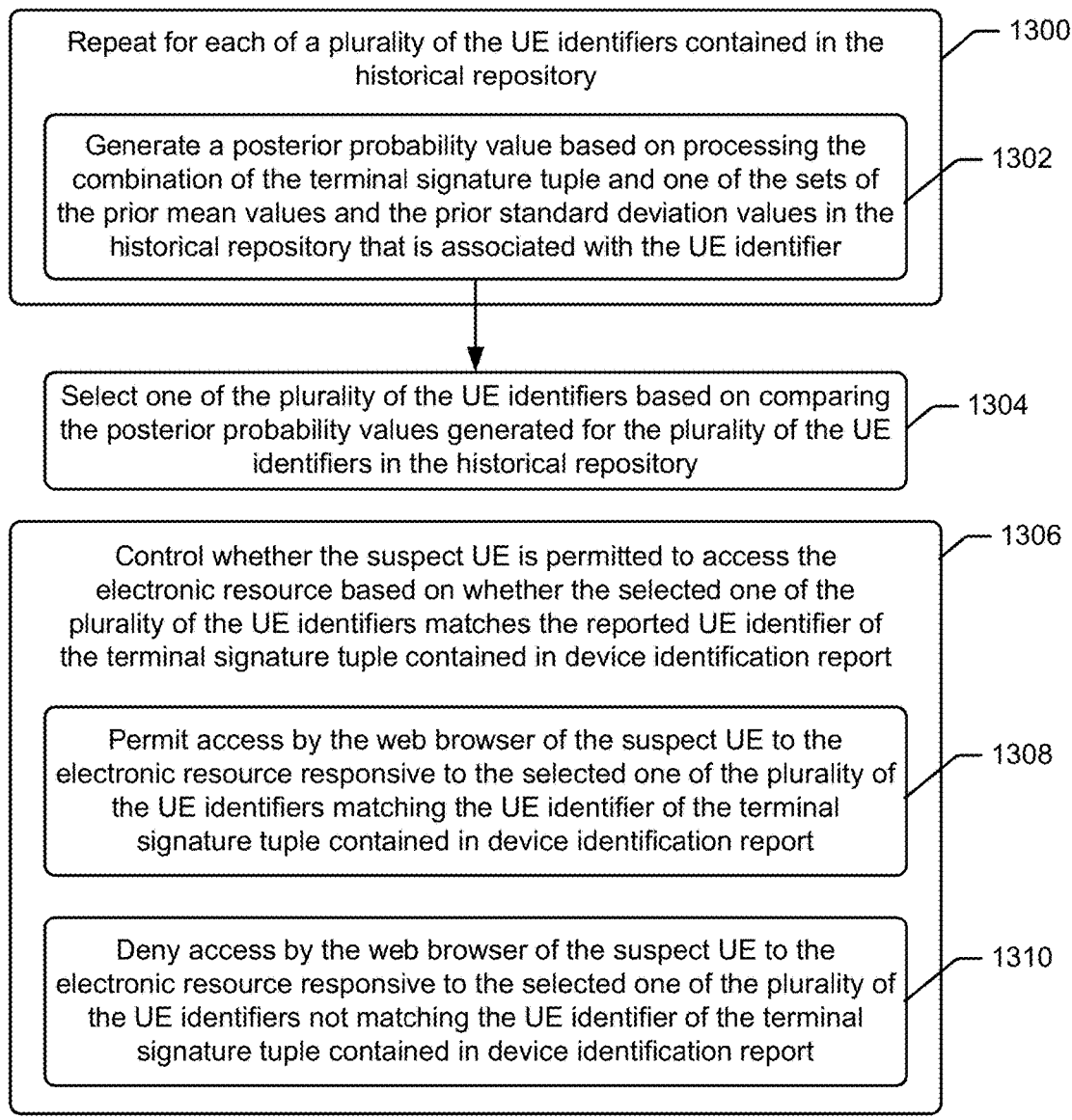

The operations of FIG. 2 can be repeated for other UE identifiers contained in the historical repository 142 when generating the posterior probability. FIG. 13 illustrates corresponding further operations that may be performed by the device authentication computer 140. Referring to FIG. 13, for each of a plurality of the UE identifiers contained in the historical repository 142, the device identification of your 140 repeats (block 1300) the generating (block 1302) a posterior probability value based on processing the combination of the terminal signature tuple and one of the sets of the prior mean values and the prior standard deviation values in the historical repository that is associated with the UE identifier.

In one embodiment, the suspect UE 100a contains a processor having a plurality of parallel processing instruction execution core circuits (e.g., Core 0, Core 1, etc.). The hash script is configured to control the processor to lock to a single one of the instruction processing cores, e.g., to one of core 0, core 1, etc., processing of instructions performing the hashing operations to hash the challenge data set. When the processor has a plurality of instruction processing cores it may be advantageous to lock the hashing operations to a single core so that the hashing script instructions are serially processed by the single core. If the instructions are not forced to be serially processed by the single core but instead are allowed to be processed by a plurality of different processing threads through a plural number of the processing cores, the multi-threading management microcode of the processor may introduce randomness and consequential variability between repetitions of the measurements of the elapsed hashing times. Such variability in measurements between repetitions may decrease the ability for the device identification computer 140 to identify the whether the suspect UE 100a corresponds to the genuine UE identified by the UE identifier, which can decrease the usefulness of the posterior probability value to be used to identify the suspect UE 100a.

The operations for controlling whether the suspect UE 100a is permitted to access the electronic resource based on the posterior probability value, can include, selecting (block 1304) one of the plurality of the UE identifiers based on comparing the posterior probability values generated for the plurality of the UE identifiers in the historical repository 142, and controlling (block 1306) whether the suspect UE 100a is permitted to access the electronic resource based on whether the selected one of the plurality of the UE identifiers matches the reported UE identifier of the terminal signature tuple contained in device identification report.

In a further embodiment, for each of the plurality of the UE identifiers contained in the historical repository 140, the device identification computer 140 generates (block 1302) the posterior probability value based on a ratio of the posterior probability value generated for the UE identifier contained in the historical repository 142, to a result of summing the posterior probability values generated for the plurality of the UE identifiers contained in the historical repository.

The device identification computer 140 may perform the selection (block 1304) based on selecting one of the plurality of the UE identifiers that is used for generating a largest one of the posterior probability values generated for the plurality of the UE identifiers.

The operations for controlling (block 1306) whether the suspect UE 100a is permitted to access the electronic resource may include permitting (block 1308) access by the web browser 112 of the suspect UE 100a to the electronic resource responsive to the selected one of the plurality of the UE identifiers matching the UE identifier of the terminal signature tuple contained in device identification report. In sharp contrast, the operations for controlling (block 1306) can deny (block 1310) access by the web browser 112 of the suspect UE 100a to the electronic resource responsive to the selected one of the plurality of the UE identifiers not matching the UE identifier of the terminal signature tuple contained in device identification report.

Figure 14:
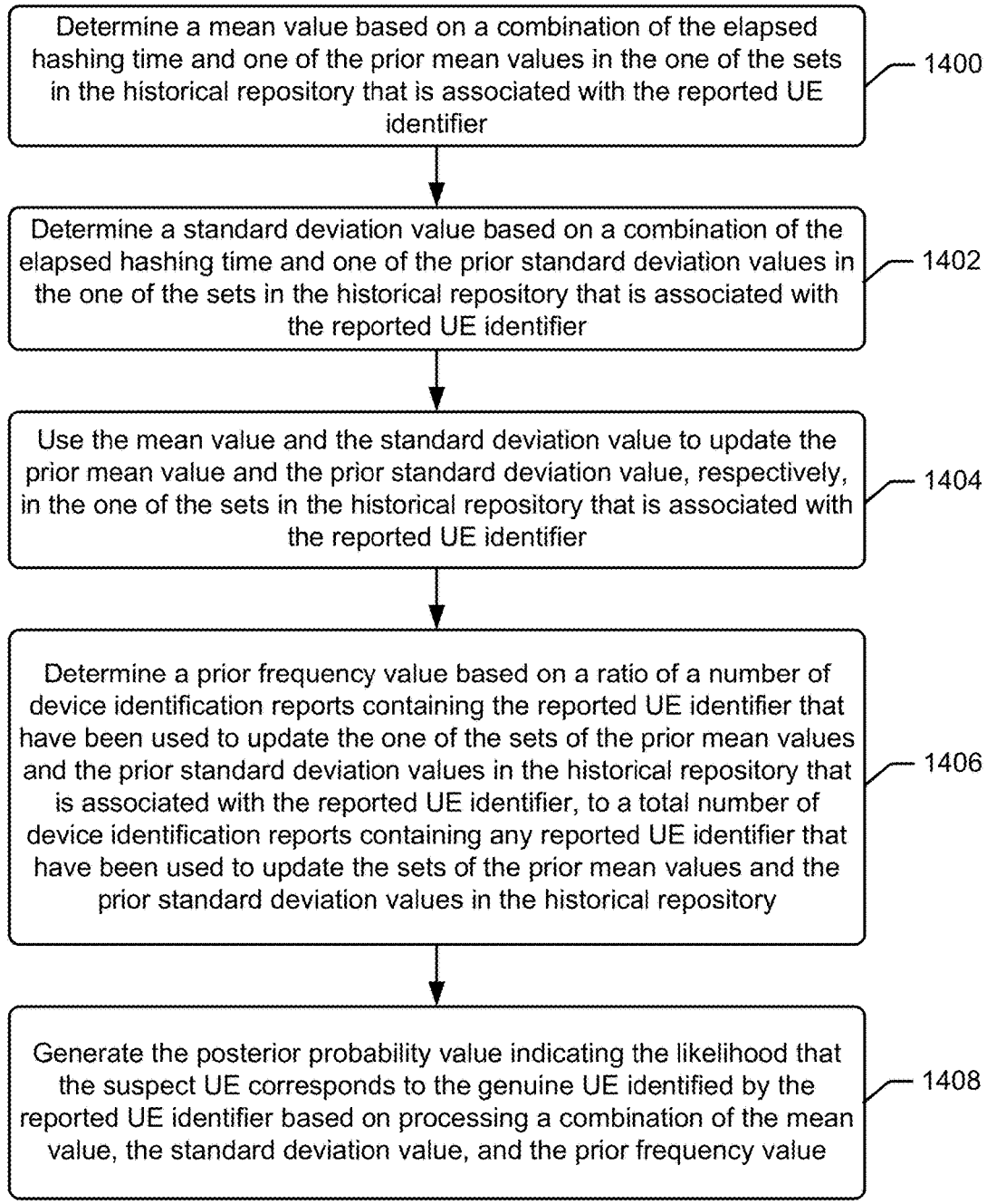

FIG. 14 illustrates operations it may be performed by the device identification computer 140 to generate (block 208, FIG. 2) the posterior probability value indicating a likelihood that the suspect UE 100a corresponds to a genuine UE identified by the reported UE identifier based on processing a combination of the terminal signature tuple and one of the sets of the prior mean values and the prior standard deviation values in the historical repository that is associated with the reported UE identifier. Referring to FIG. 14, a mean value is determined (block 1400) based on a combination of the elapsed hashing time and one of the prior mean values in the one of the sets in the historical repository that is associated with the reported UE identifier. A standard deviation value is determined (block 1404) based on a combination of the elapsed hashing time and one of the prior standard deviation values in the one of the sets in the historical repository 142 that is associated with the reported UE identifier. The mean value and the standard deviation value are used (block 1404) to update the prior mean value and the prior standard deviation value, respectively, in the one of the sets in the historical repository 142 that is associated with the reported UE identifier. A prior frequency value is determined (block 1406) based on a ratio of a number of device identification reports containing the reported UE identifier that have been used to update the one of the sets of the prior mean values and the prior standard deviation values in the historical repository that is associated with the reported UE identifier, to a total number of device identification reports containing any reported UE identifier that have been used to update the sets of the prior mean values and the prior standard deviation values in the historical repository 142. The posterior probability value indicating the likelihood that the suspect UE corresponds to the genuine UE identified by the reported UE identifier is then generated (block 1408) based on processing a combination of the mean value, the standard deviation value, and the prior frequency value.

In a further embodiment illustrated in FIG. 15, the device identification computer 140 generates the posterior probability value based on processing (block 1500) the combination of the mean value and the standard deviation value to generate a conditional likelihood probability (likelihood) value that the suspect UE corresponds to the genuine UE identified by the reported UE identifier, based on the following equation:

$$\text{Likelihood} = e^{-((X-\mu)^2/2\sigma^2)}/\sigma\sqrt{(2\pi)}$$

The term X refers to the elapsed hashing time for the hashing to be performed on the challenge data set, and the term σ refers to the standard deviation value, and the term μ refers to the mean value. The posterior probability value is generated based on multiplying the likelihood value and the prior frequency value.

A potential advantage of these operations, is that the device identification computer 140 can operate to only store in the historical repository 142 the mean and standard deviation values, per UE, along with the priors, and the likelihood can be computed by a computationally efficient formula. These operations also assign probabilities to values completely outside the range seen for a UE.

The operations for controlling whether the suspect UE is permitted to access the electronic resource based on the posterior probability value, can include for each of a plurality of the UE identifiers contained in the historical repository, generating a posterior probability value based on processing the combination of the terminal signature tuple and one of the sets of the prior mean values and the prior standard deviation values in the historical repository 142 that is associated with the UE identifier. One of the plurality of the UE identifiers can be selected based on comparing the posterior probability values generated for the plurality of the UE identifiers in the historical repository 142, by selecting one of the plurality of the UE identifiers that is used to generate a largest one of the posterior probability values. Whether the suspect UE is permitted to access the electronic resource can then be controlled based on whether the selected one of the plurality of the UE identifiers matches the UE identifier contained in the device identification message.

Figure 17:
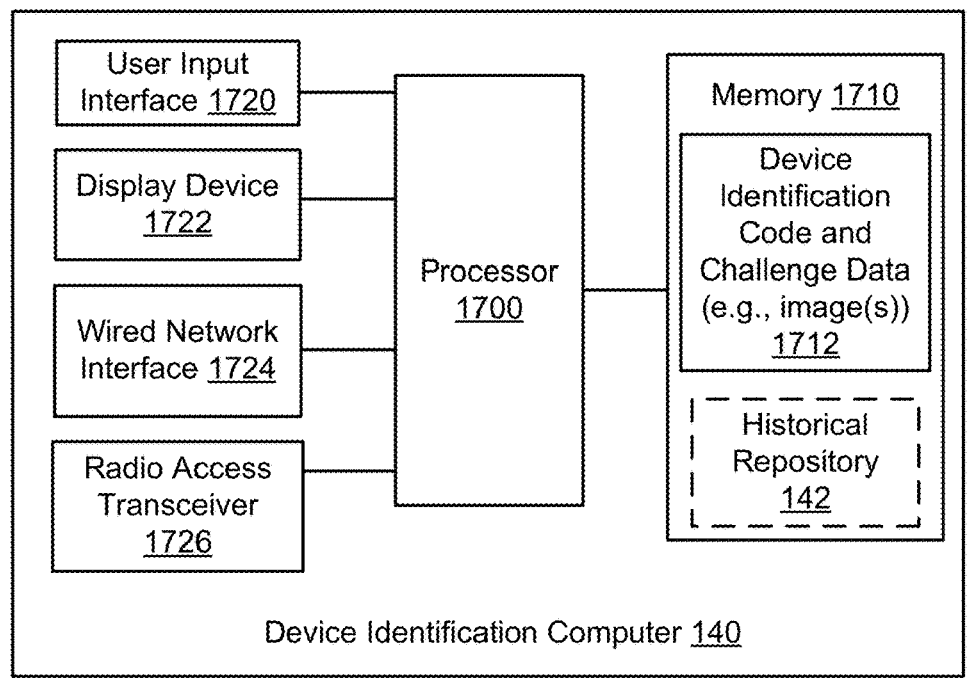
FIG. 17 is a block diagram of a device identification computer configured according to some embodiments of the present disclosure.

FIG. 17 is a block diagram of a device identification computer 140 configured according to some embodiments of the present disclosure. The identification computer 140 includes a processor 1700, a memory 1710, and a network interface circuit which may include a radio access transceiver 1726 and/or a wired network interface 1724 (e.g., Ethernet interface). The radio access transceiver 1726 can include, but is not limited to, a LTE or other cellular transceiver, WIFI transceiver (IEEE 802.11), Bluetooth, WiMax transceiver, or other radio communication transceiver configured to communicate with UEs 100 via the radio access network(s) 130.

The processor 1700 may include one or more data processing circuits, such as a general purpose and/or special purpose processor (e.g., microprocessor and/or digital signal processor) that may be collocated or distributed across one or more networks. The processor 1700 is configured to execute device identification computer program code 1712 (e.g., including JavaScripts configured to hash challenge data) in the memory 1710, described below as a non-transitory computer readable medium, to perform at least some of the operations described herein as being performed by a device identification computer 140. The memory 1710 may further include the challenge data and the historical repository 142. The identification computer 140 may further include a user input interface 1720 (e.g., touch screen, keyboard, keypad, etc.) and a display device 1722.

Although various embodiments of the device identification computer 140 have been shown as being separate from the content server 150 and from the UE 100, in some other embodiments some or all of the operations disclosed herein as being performed by the identification computer 140 may be included in and performed by the content server 150 and/or may be included in and performed by the UE 100.

The device identification computer 140 may control access by UEs 100 to electronic resources that can include, but are not limited to, application program code, digital video, digital audio, digital pictures, user information, webpage information, etc., which may reside in or otherwise be accessible through the content server 150.

Figure 18:
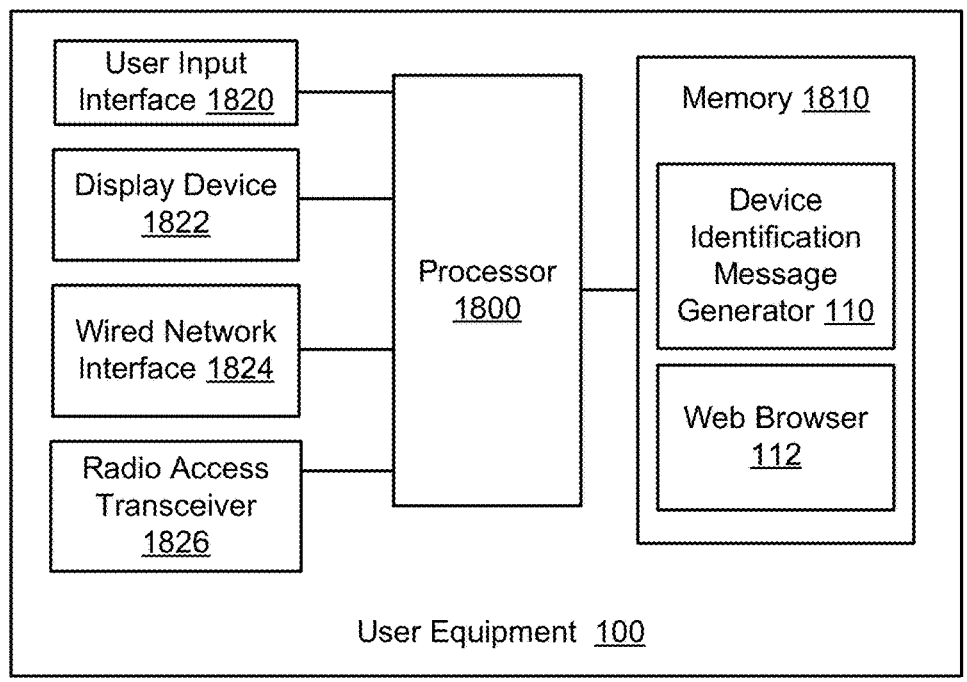
FIG. 18 is a block diagram of a UE configured according to some embodiments of the present disclosure.

FIG. 18 is a block diagram of a UE 100 configured according to some embodiments of the present disclosure. The UE 100 includes a processor 1800, a memory 1810, and a network interface circuit which may include a radio access transceiver 1826 and/or a wired network interface 1824 (e.g., Ethernet interface). The radio access transceiver 1826 can include, but is not limited to, a LTE or other cellular transceiver, WIFI transceiver (IEEE 802.11), Bluetooth, WiMax transceiver, or other radio communication transceiver configured to communicate with the device identification computer 140 via the radio access network(s) 130.

The processor 1800 may include one or more data processing circuits, such as a general purpose and/or special purpose processor (e.g., microprocessor and/or digital signal processor) that may be collocated or distributed across one or more networks. The processor 1800 is configured to execute device identification message generator code 110 in the memory 1810, described below as a non-transitory computer readable medium, to perform at least some of the operations described herein as being performed by a UE 100. The memory 1810 further includes the web browser 112 that processes the JavaScript to perform hashing operations on the challenge data that is received from the device identification computer 140. The UE 100 may further include a user input interface 1820 (e.g., touch screen, keyboard, keypad, etc.) and a display device 1822.

Further Definitions and Embodiments

In the above-description of various embodiments of the present disclosure, aspects of the present disclosure may be illustrated and described herein in any of a number of patentable classes or contexts including any new and useful process, machine, manufacture, or composition of matter, or any new and useful improvement thereof. Accordingly, aspects of the present disclosure may be implemented in entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product comprising one or more computer readable media having computer readable program code embodied thereon.

Any combination of one or more computer readable media may be used. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

It is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Like reference numbers signify like elements throughout the description of the figures.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The invention claimed is:

1. A method of performing operations on a processor of a device identification computer, the method comprising:
   maintaining in a memory device a historical repository of user equipment (UE) identifiers associated with sets of prior mean values and prior standard deviation values;
   receiving a browser request message via a network interface from a web browser being processed by a suspect UE, the browser request message requesting access to an electronic resource controlled by the device identification computer;
   sending an identification challenge message via the network interface toward the web browser being processed by the suspect UE, the identification challenge message containing a challenge data set and a hash script, the hash script configured to be processed by the web browser to hash the challenge data set and to report a measurement of elapsed hashing time for the hashing to be performed on the challenge data set;
   receiving a device identification report from the web browser via the network interface, the device identification report containing a terminal signature tuple of a reported UE identifier and the elapsed hashing time;
   generating a posterior probability value indicating a likelihood that the suspect UE corresponds to a genuine UE identified by the reported UE identifier based on processing a combination of the terminal signature tuple and one of the sets of the prior mean values and the prior standard deviation values in the historical repository that is associated with the reported UE identifier; and
   controlling whether the suspect UE is permitted to access the electronic resource based on the posterior probability value.

2. The method of claim 1, further comprising:
   retrieving a digital image from the memory device; and
   generating the identification challenge message to contain the digital image.

3. The method of claim 1, further comprising responsive to receipt of the browser request message:
   identifying a type of the web browser based on content of the browser request message;
   selecting the hash script from among a set of hash scripts using the type of the web browser that is identified; and generating the identification challenge message, which is to be sent, to contain the hash script that is selected.

4. The method of claim 1, further comprising:
identifying a user identifier based on content of the browser request message;
selecting the hash script from among a set of hash scripts using the user identifier that is identified; and
generating the identification challenge message, which is to be sent, to contain the hash script that is selected.

5. The method of claim 1, further comprising responsive to receipt of the browser request message:
identifying a user identifier based on content of the browser request message;
selecting the challenge data set from among a collection of challenge data sets using the user identifier that is identified; and
generating the identification challenge message, which is to be sent, to contain the challenge data set that is selected.

6. The method of claim 5, wherein the selecting the challenge data set from among a collection of challenge data sets using the user identifier that is identified, comprises:
converting the user identifier into a set lookup address; and
retrieving a digital image from the memory device using the set lookup pointer.

7. The method of claim 1, further comprising:
for each of a plurality of the UE identifiers contained in the historical repository, repeating the generating a posterior probability value based on processing the combination of the terminal signature tuple and one of the sets of the prior mean values and the prior standard deviation values in the historical repository that is associated with the UE identifier,
wherein the controlling whether the suspect UE is permitted to access the electronic resource based on the posterior probability value, comprises:
selecting one of the plurality of the UE identifiers based on comparing the posterior probability values generated for the plurality of the UE identifiers in the historical repository; and
controlling whether the suspect UE is permitted to access the electronic resource based on whether the selected one of the plurality of the UE identifiers matches the reported UE identifier of the terminal signature tuple contained in device identification report.

8. The method of claim 7, wherein for each of the plurality of the UE identifiers contained in the historical repository, the generating a posterior probability value based on processing the combination of the terminal signature tuple and one of the sets of the prior mean values and the prior standard deviation values in the historical repository that is associated with the UE identifier, further comprises:
generating the posterior probability value based on a ratio of the posterior probability value generated for the UE identifier contained in the historical repository, to a result of summing the posterior probability values generated for the plurality of the UE identifiers contained in the historical repository.

9. The method of claim 8, wherein the selecting one of the plurality of the UE identifiers based on comparing the posterior probability values generated for the plurality of the UE identifiers in the historical repository, comprises:
selecting one of the plurality of the UE identifiers that is used for generating a largest one of the posterior probability values generated for the plurality of the UE identifiers.

10. The method of claim 7, wherein the controlling whether the suspect UE is permitted to access the electronic resource based on whether the selected one of the plurality of the UE identifiers matches the reported UE identifier of the terminal signature tuple contained in device identification report, comprises:
permitting access by the web browser of the suspect UE to the electronic resource responsive to the selected one of the plurality of the UE identifiers matching the UE identifier of the terminal signature tuple contained in device identification report; and
denying access by the web browser of the suspect UE to the electronic resource responsive to the selected one of the plurality of the UE identifiers not matching the UE identifier of the terminal signature tuple contained in device identification report.

11. The method of claim 1, wherein the generating a posterior probability value indicating a likelihood that the suspect UE corresponds to a genuine UE identified by the reported UE identifier based on processing a combination of the terminal signature tuple and one of the sets of the prior mean values and the prior standard deviation values in the historical repository that is associated with the reported UE identifier, comprises:
determining a mean value based on a combination of the elapsed hashing time and one of the prior mean values in the one of the sets in the historical repository that is associated with the reported UE identifier;
determining a standard deviation value based on a combination of the elapsed hashing time and one of the prior standard deviation values in the one of the sets in the historical repository that is associated with the reported UE identifier;
using the mean value and the standard deviation value to update the prior mean value and the prior standard deviation value, respectively, in the one of the sets in the historical repository that is associated with the reported UE identifier;
determining a prior frequency value based on a ratio of a number of device identification reports containing the reported UE identifier that have been used to update the one of the sets of the prior mean values and the prior standard deviation values in the historical repository that is associated with the reported UE identifier, to a total number of device identification reports containing any reported UE identifier that have been used to update the sets of the prior mean values and the prior standard deviation values in the historical repository; and
generating the posterior probability value indicating the likelihood that the suspect UE corresponds to the genuine UE identified by the reported UE identifier based on processing a combination of the mean value, the standard deviation value, and the prior frequency value.

12. The method of claim 11, wherein the generating the posterior probability value indicating the likelihood that the suspect UE corresponds to the genuine UE identified by the reported UE identifier based on processing a combination of the mean value, the standard deviation value, and the prior frequency value, comprises:
processing the combination of the mean value and the standard deviation value to generate a conditional likelihood probability (likelihood) value that the suspect UE corresponds to the genuine UE identified by the reported UE identifier, based on the following equation:

$$\text{Likelihood} = e^{-((X-\mu)^2/2/\sigma^2)} \sigma \sqrt{(2\pi)}$$

wherein the term X refers to the elapsed hashing time for the hashing to be performed on the challenge data set, the term σ refers to the standard deviation value, and the term μ refers to the mean value, and wherein the posterior probability value is generated based on multiplying the likelihood value and the prior frequency value.

13. The method of claim 12, wherein the controlling whether the suspect UE is permitted to access the electronic resource based on the posterior probability value, comprises:

for each of a plurality of the UE identifiers contained in the historical repository, generating a posterior probability value based on processing the combination of the terminal signature tuple and one of the sets of the prior mean values and the prior standard deviation values in the historical repository that is associated with the UE identifier;

selecting one of the plurality of the UE identifiers based on comparing the posterior probability values generated for the plurality of the UE identifiers in the historical repository, by selecting one of the plurality of the UE identifiers that is used to generate a largest one of the posterior probability values; and controlling whether the suspect UE is permitted to access the electronic resource based on whether the selected one of the plurality of the UE identifiers matches the UE identifier contained in the device identification message.

14. A device identification computer comprising:

a network interface circuit configured to communicate with user equipments (UEs);

a processor circuit coupled to the network interface; and a memory circuit coupled to the processor circuit and storing program code which when executed by the processor circuit causes the processor circuit to perform operations comprising:

maintaining in a memory device a historical repository of UE identifiers associated with sets of prior mean values and prior standard deviation values;

receiving, via a network interface, a browser request message from a web browser being processed by a suspect UE, the browser request message requesting access to an electronic resource controlled by the device identification computer;

sending an identification challenge message via the network interface toward the web browser being processed by the suspect UE, the identification challenge message containing a challenge data set and a hash script, the hash script configured to be processed by the web browser to hash the challenge data set and to report a measurement of elapsed hashing time for the hashing to be performed on the challenge data set;

receiving an device identification report from the web browser via the network interface, the device identification report containing a terminal signature tuple of a reported UE identifier and the elapsed hashing time;

generating a posterior probability value indicating a likelihood that the suspect UE corresponds to a genuine UE identified by the reported UE identifier based on processing a combination of the terminal signature tuple and one of the sets of the prior mean values and the prior standard deviation values in the historical repository that is associated with the reported UE identifier; and controlling whether the suspect UE is permitted to access the electronic resource based on the posterior probability value.

15. The device identification computer of claim 14, wherein the operations further comprise responsive to receipt of the browser request message:

identifying a type of the web browser based on content of the browser request message;

selecting the hash script from among a set of hash scripts using the type of the web browser that is identified; and generating the identification challenge message, which is to be sent, to contain the hash script that is selected.

16. The device identification computer of claim 14, wherein the operations further comprise responsive to receipt of the browser request message:

identifying a user identifier based on content of the browser request message;

selecting the challenge data set from among a collection of challenge data sets using the user identifier that is identified; and generating the identification challenge message, which is to be sent, to contain the challenge data set that is selected.

17. The device identification computer of claim 14, wherein the operations further comprise:

for each of a plurality of the UE identifiers contained in the historical repository, repeating the generating a posterior probability value based on processing the combination of the terminal signature tuple and one of the sets of the prior mean values and the prior standard deviation values in the historical repository that is associated with the UE identifier, wherein the controlling whether the suspect UE is permitted to access the electronic resource based on the posterior probability value, comprises:

selecting one of the plurality of the UE identifiers based on comparing the posterior probability values generated for the plurality of the UE identifiers in the historical repository; and controlling whether the suspect UE is permitted to access the electronic resource based on whether the selected one of the plurality of the UE identifiers matches the reported UE identifier of the terminal signature tuple contained in device identification report.

18. The device identification computer of claim 17, wherein for each of the plurality of the UE identifiers contained in the historical repository, the repeating the generating a posterior probability value based on processing the combination of the terminal signature tuple and one of the sets of the prior mean values and the prior standard deviation values in the historical repository that is associated with the UE identifier, further comprises:

generating the posterior probability value based on a ratio of the posterior probability value generated for the UE identifier contained in the historical repository, to a result of summing the posterior probability values generated for the plurality of the UE identifiers contained in the historical repository.

19. The device identification computer of claim 17, wherein the controlling whether the suspect UE is permitted to access the electronic resource based on whether the selected one of the plurality of the UE identifiers matches the reported UE identifier of the terminal signature tuple contained in device identification report, comprises:
   permitting access by the web browser of the suspect UE to the electronic resource responsive to the selected one of the plurality of the UE identifiers matching the UE identifier of the terminal signature tuple contained in device identification report; and
   denying access by the web browser of the suspect UE to the electronic resource responsive to the selected one of the plurality of the UE identifiers not matching the UE identifier of the terminal signature tuple contained in device identification report.

\* \* \* \* \*